No. 615,772. Patented Dec. 13, 1898.
W. A. WHITCOMB.
GATE.
(Application filed May 31, 1898.)
(No Model.) 3 Sheets—Sheet 2.
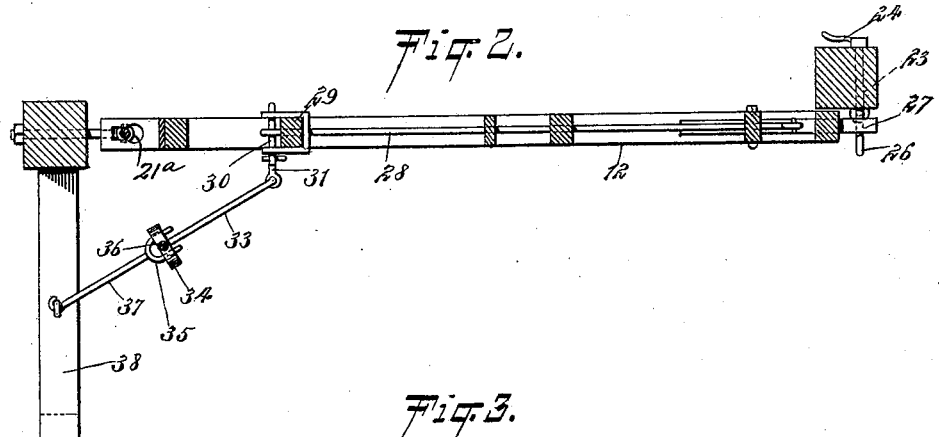
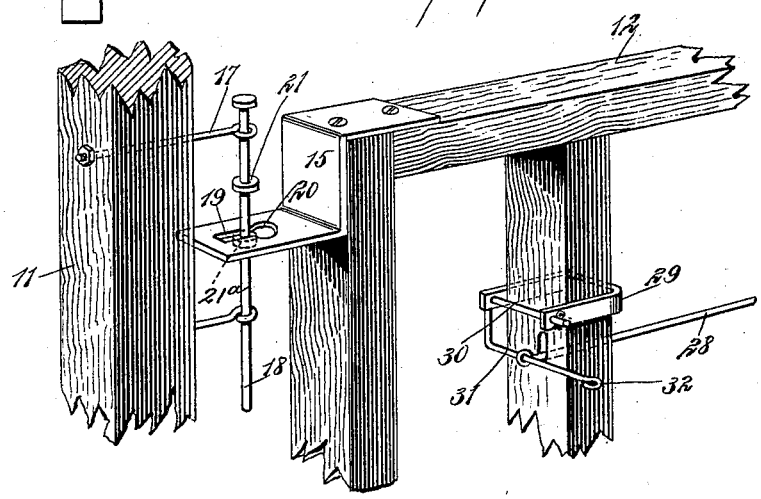
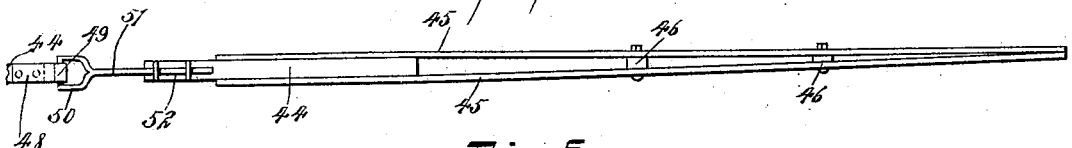
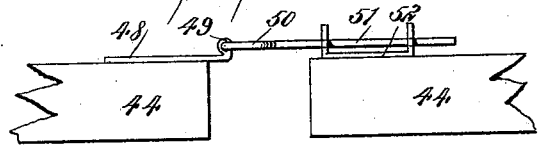
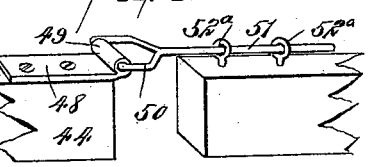
WITNESSES:
William P. Gaebel
Isaac Owen
INVENTOR
W. A. Whitcomb
BY
ATTORNEYS.
THE NORRIS PETERS CO., PHOTO-LITHO., WASHINGTON, D. C.

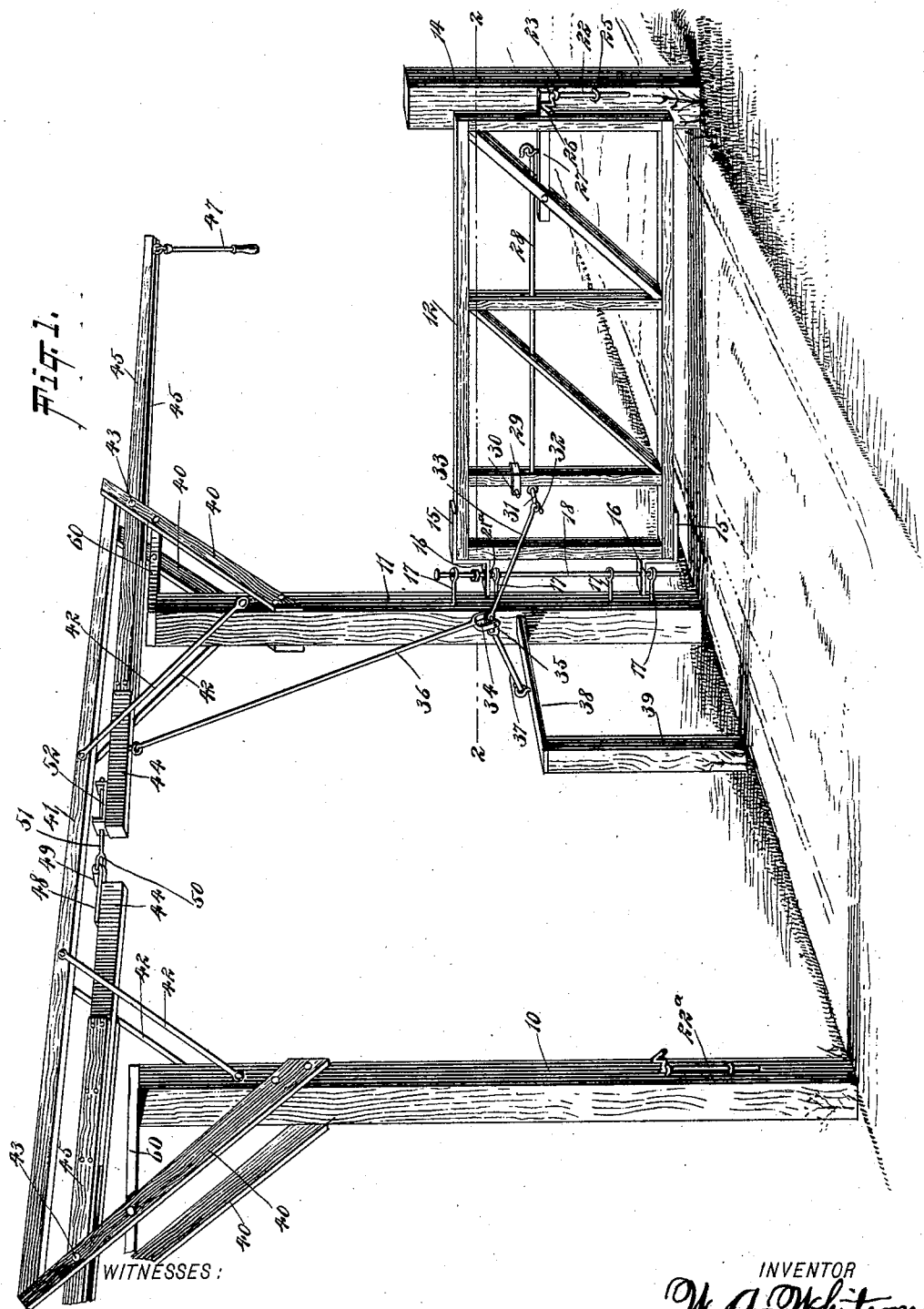

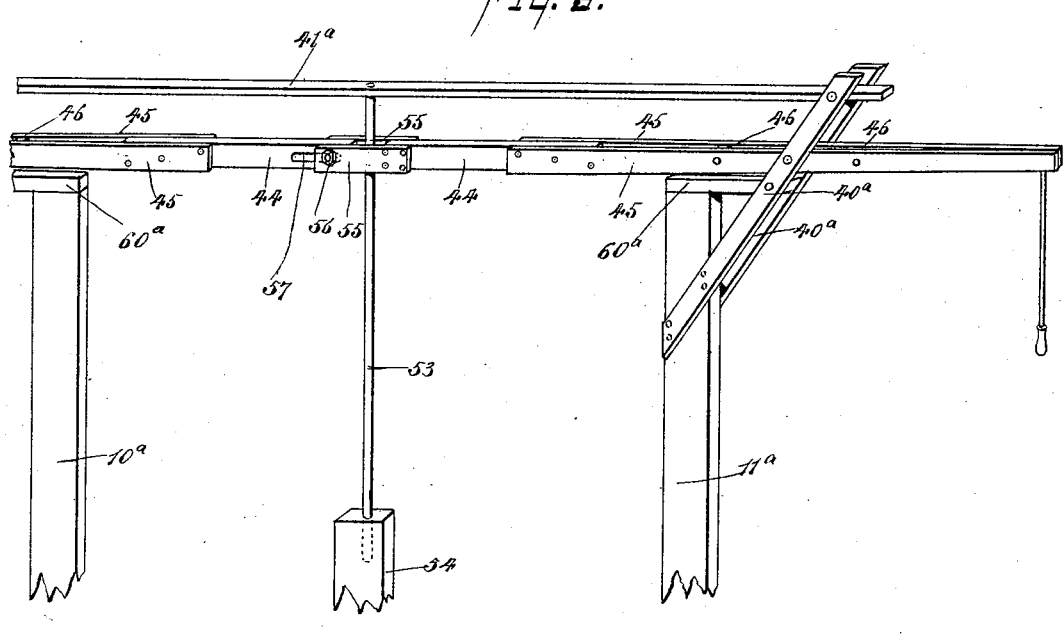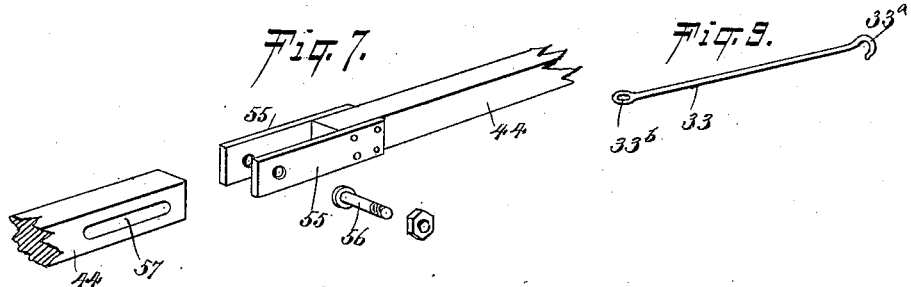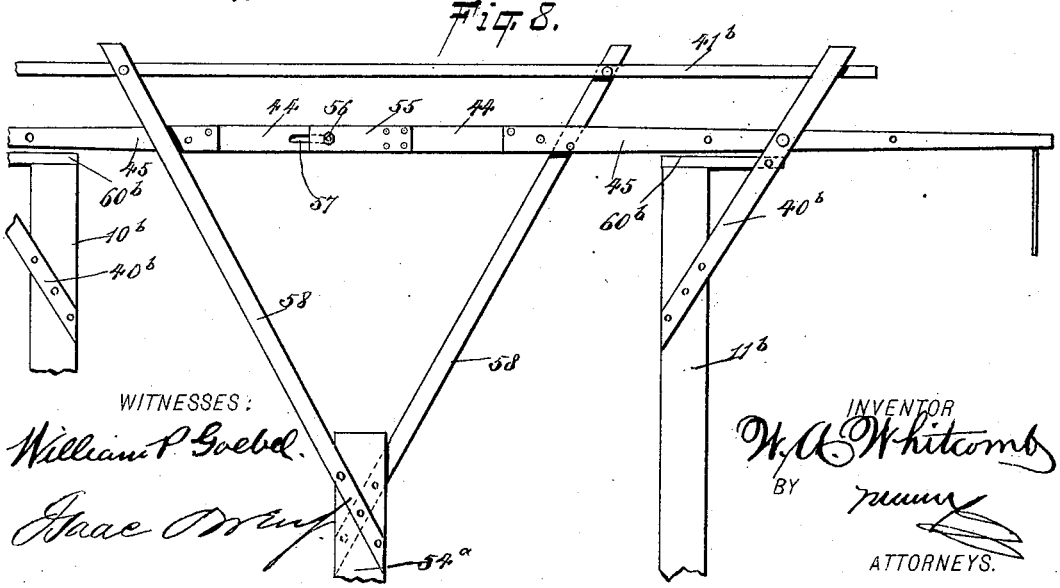

UNITED STATES PATENT OFFICE.

WILLIAM A. WHITCOMB, OF DOWNS, ILLINOIS.

GATE.

SPECIFICATION forming part of Letters Patent No. 615,772, dated December 13, 1898.

Application filed May 31, 1898. Serial No. 682,172. (No model.)

*To all whom it may concern:*

Be it known that I, WILLIAM A. WHITCOMB, of Downs, in the county of McLean and State of Illinois, have invented a new and Improved Gate, of which the following is a full, clear, and exact description.

This invention is a gate adapted especially for use on farms and other rural places, and of that class in which the gate is mounted to swing across the road and be operated from each side by levers mounted above the gate and connected therewith and projecting oppositely in the direction of the roadway.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a perspective view of the invention with a part of one lever broken away. Fig. 2 is a horizontal section looking down on the line 2 2 of Fig. 1. Fig. 3 is a fragmentary perspective view showing a part of the gate hinge and latch mechanisms. Fig. 4 is a plan view showing one of the levers and the devices for connecting the levers with each other. Fig. 5 is a detail showing said devices for connecting the levers. Fig. 5$^a$ is a detail of a modification of the devices shown in Fig. 5. Fig. 6 is a fragmentary perspective view showing modifications in the lever devices. Fig. 7 is a similar view illustrating said modifications. Fig. 8 is a side elevation illustrating further modifications in the levers and the means for mounting them, and Fig. 9 is a detail view of a part to be hereinafter fully described.

The form of the invention shown in Figs. 1 to 5 comprises two vertical posts, (designated 10 and 11, respectively.) The gate 12 is mounted to swing on the post 11, and when closed engages at its free end with a post 14, planted on the side of the roadway opposite the side occupied by the posts 10 and 11. The gate 12 is a rectangular structure of any preferred form and has at each inner corner a hinge-plate. These hinge-plates each comprise a portion 15, bent at right angles to embrace and strengthen the inner corners of the gate, to which corners the angular portions 15 are rigidly fastened. Each hinge-plate also comprises an outwardly-bent arm 16. Fastened rigidly to the post 11 are four eye pins or bolts 17, which are arranged in pairs, one pair for each hinge-plate. The eyes of the pins or bolts 17 are vertically alined to receive a headed pintle-rod 18, that extends vertically through each eye. The arm 16 of the lower hinge-plate is provided with an orifice, in which the pintle-rod 18 is snugly received, and, as shown in Fig. 3, the arm 16 of the upper hinge-plate is provided with a slot 19, terminating at its inner end in an enlargement 20. The pintle-rod 18 is provided at a point between the two uppermost eyebolts 17 with a rigidly-secured collar 21, which may pass through the enlargement 20 of the upper hinge-plate, but which cannot move through the slot 19 therein. The weight of the gate hanging on the rod 18 will throw the gate outward at its upper inner corner, so that the pintle-rod 18 is normally held in the slot 19; but by lifting the gate the enlargement 20 may be brought into position to receive the collar 21, and thus the gate may be raised, with the upper hinge-plate above the enlargement. Then by letting the gate swing back to its normal position the arm 16 of the upper hinge-plate will be moved so that the rod 18 again enters the slot 19, and the gate is held in elevated position. By these means the vertical position of the gate may be regulated should it be desired for any purpose to raise or lower the gate. The rod 18 is provided with a second collar 21$^a$, located below the collar 21 and similar thereto, on which collar 21$^a$ the gate is supported when in the position shown in Figs. 1 and 3.

The post 14 is provided with a keeper-rod 22, rigidly yet adjustably secured by an eyebolt 23, provided with a hand-nut 24, as may be seen in Fig. 2. The post 14 may also be provided with an eye 25 to further hold the keeper-rod 22. The upper end of the keeper-rod is provided with an outwardly and upwardly disposed extension 26, coacting with a vertically-swinging latch 27, pivotally mounted in the gate. The latch 27 is joined by means of a hook and eye to a rod 28, that slides horizontally in the gate and longitudinally with the same. The rod 28 is mounted in slots in the gate, such slots being vertically disposed. To a brace or other portion of the gate, at a point adjacent to its inner end, is rigidly secured a U-shaped clamp 29, in the end of which is mounted to rock the arm 30 of a U-shaped rod, which has its opposite arm 31 hanging down from the clamp 29 and of a length greater than that of the arm 30, so as to project laterally beyond the gate. The rod 28 extends laterally through the portion of the gate to which the clamp 29 is attached, and has an eye loosely receiving the arm 31 of the said U-shaped rod. The arm 31 of said U-shaped rod is also provided with an eye 32 in its end. To this eye is pivotally joined the hook $33^a$ of a rod 33, (for which see Fig. 9,) which extends in a diagonal direction laterally from the gate and toward the line of the posts 10 and 11. The outer terminal of the rod 33 is joined pivotally by an eye $33^b$ to the pivot that connects the clevises 34 and 35 of the rods 36 and 37. The rod 37 is supported on a beam 38, held horizontally in rigid position between the post 11 and a post 39, mounted rigidly adjacent to the post 11. The rod 36 extends to the hereinafter-described levers, so that upon drawing on the rod 36 the U-shaped rod of the clamp 29 will be caused to swing on the arm 30 of such rod, which has the effect, first, to slide the rod 28 inward and raise the outer end of latch 27, and, next, to swing the gate 12 to open position. The post 10 may be provided with a keeper $22^a$, similar to the keeper 22, with which former keeper the latch 27 engages as the gate swings to open position. The slight vertical swinging of the rod 28 that is necessary to these operations is permitted by the vertical slots in which the rod is mounted, as previously described. The gate is closed by drawing down on either one of the operating-levers, which first lifts the latch and then swings the gate to closed position. As the latch 27 engages the end 26 of the keeper 22 in the act of closing the gate the latch will ride up the inclined extremity of the keeper-rod 22.

The upper end of each post 10 and 11 is provided with two rigidly-attached and diagonally-extending braces 40, lying one on each side of each post. The top of each post 10 and 11 is provided with an outwardly-extending brace 60, which braces respectively pass between and are secured to the pairs of braces 40. The upper ends of the braces 40 carry rigidly a horizontal beam 41, located above the upper extremities of the posts 10 and 11 and extending between the same. The beam 41 is further strengthened by means of braces 42, which braces are two for each post 10 and 11 and, like the braces 40, are located one on each side of each post. The two operating-levers extend one between each pair of braces 40 and 42. The levers are fulcrumed to the respective pairs of braces 40 by pins 43, and the braces 42 serve to guide the levers as they swing vertically, so as to prevent lateral play of the levers. As shown best in Fig. 4, each lever has a butt 44, to each side of which is rigidly fastened a tapered slat 45. These slats are converged to engage each other at their outer ends and are braced at intermediate points by blocks 46. This construction forms a strong, cheap, and light lever. The outer end of each lever may be provided with a hand-rope or handle 47, one of which is shown in Fig. 1. The inner end of one operating-lever is provided at its butt 44 with a plate 48, having a tubulated inner edge 49, in which is fitted loosely the eye 50 of a swinging rod 51. The rod 51 slides through orifices in the upturned ends of a plate 52, fastened rigidly to the remaining operating-lever. By such means the levers are connected so as to swing freely on their pivots and so that the movement of one lever will impart a like movement to the other lever. The rod 36 is connected with one of the levers at a point adjacent to its inner end.

A person operating the gate draws down one of the levers by means of the attached handle 47, which causes both levers to swing, and thus insures the transmission of their movement to the rod 36. This rod operates in the manner before described to open and close the gate.

The modification shown in Figs. 6 and 7 relates to the levers and their supporting devices, and consists in providing the posts $10^a$ and $11^a$ each with two braces $40^a$, only one pair of braces being shown in Fig. 6. Each post $10^a$ and $11^a$ has an outwardly-running brace $60^a$ respectively joined to the braces $40^a$. The braces $40^a$ hold rigidly a beam $41^a$, which is strengthened at its middle by means of a vertical rod 53, supported rigidly on a post 54, planted between the posts $10^a$ and $11^a$. The two levers are respectively fulcrumed between the two pairs of braces $40^a$ and are of the same construction as the levers previously described. The levers of Figs. 6 and 7 are joined to each other by a construction different from that shown in the previously-described figures. This modified connecting device consists in two plates 55, rigidly secured to the inner end of the butt 44 of one of the levers and projecting in parallelism beyond said butt. Through the inner ends of the plates 55 extends a fixed pin or bolt 56. The outer ends of the plates 55 span the butt 44 of the other lever, and the pin or bolt 56 passes loosely through a slot 57, formed in said butt of the other lever. It may readily be seen that by swinging one lever a like movement is imparted to the other lever through the medium of the plates 55 and bolt 56, so that the operation of the gate is the same as that previously described.

Fig. 8 shows a further modification of the means for mounting the levers, which modified construction embodies posts $10^b$ and $11^b$, each supporting two rigid braces $40^b$, like those previously described, which braces in turn support a horizontal beam $41^b$. The posts $10^b$ and $11^b$ have each a brace $60^b$ similar in form and arrangement to the braces 60 and 60ᵃ previously described. A post 54ᵃ is planted between the posts 10ᵇ and 11ᵇ and has attached to each side a rigid diagonal brace 58. The braces 58 extend oppositely from each other, and each brace is joined at its upper end to a beam 41ᵇ, so that the levers (which, with their connecting devices, are the same as those shown in Figs. 6 and 7) will be guided in their vertical movement and prevented from lateral deviation.

Fig. 5ᵃ is a modification of the construction shown in Fig. 5, in which modification the plate 52 is replaced by two eyes 52ᵃ, whereby the rod 51 is slidably carried.

Having thus described my invention, I claim as new and desire to secure by Letters Patent—

1. A gate having a hinge-plate, comprising an angular portion embracing a corner of the gate and strengthening the same, and an outwardly-extended arm having a slot with an enlargement at one end to receive the pintle-rod.

2. The combination of a hinge-plate having therein a slot with an enlargement at its inner end, and a pintle-rod having a collar rigidly attached thereto, the collar being capable of passing through the enlargement of the slot in the hinged plate, and being incapable of passing through the other portion of the slot.

3. The combination of a post, a gate, a pintle-rod secured to the post, a collar attached rigidly to the pintle-rod, and hinge-plates attached to the gate, one of said hinge-plates having a slot with an enlargement at one end, the collar being capable of passing through the enlargement and being incapable of passing through the other portion of the slot.

4. The combination with a swinging gate and the post thereof, of a keeper-rod attached rigidly to the post and extending vertically thereon and having its upper end bent outwardly and upwardly to form the keeper proper, a latch mounted to swing vertically in the gate and a sliding rod having connection with the inner portion of the latch and mounted on the gate.

5. The combination of two levers, a tubulated plate attached to one lever, a rod having an eye mounted to swing in the tubulated portion of the plate, and a keeper attached to the remaining lever and slidably carrying the rod.

6. The combination of two gate-operating levers, and a rod pivotally attached to one lever and mounted on the other so as to slide longitudinally thereon.

7. The combination of two posts, two braces secured to each post, the braces being arranged on opposite sides of the respective posts, a beam located above the posts and running horizontally between the same and held rigidly by the braces, additional braces running between the beam and posts, and a lever fulcrumed between each pair of first-named braces, the levers being joined to each other and guided by the said additional braces.

8. The combination of two posts, two braces attached to each post on opposite faces thereof, a beam located above the posts and extending between the same, and held rigidly by the braces, and two levers joined to each other and respectively fulcrumed between the pairs of braces.

9. The combination with a gate, of a latch-rod, a clamp attached rigidly to the gate, and a U-shaped bar, of the two parallel arms of which, the one is mouted to rock in the clamp, and the other is connected with the latch-rod.

10. The combination with a gate, of a latch-rod, a U-shaped clamp embracing a post of the gate, and a bar mounted to rock in the ends of the arms of the said U-shaped clamp, the said bar being connected with the latch-rod to operate the same.

WILLIAM A. WHITCOMB.

Witnesses:
I. M. ADAMS,
J. O. KILLION.